(12) United States Patent
Santiago (10) Patent No.: US 10,906,488 B2
(45) Date of Patent: Feb. 2, 2021

(54) VEHICLE DENT PROTECTION ASSEMBLY

(71) Applicant: Edward Santiago, Lake Worth, FL (US)

(72) Inventor: Edward Santiago, Lake Worth, FL (US)

( * ) Notice: Subject to any disclaimer, the term of this patent is extended or adjusted under 35 U.S.C. 154(b) by 68 days.

(21) Appl. No.: 16/253,351

(22) Filed: Jan. 22, 2019

(65) Prior Publication Data

US 2020/0231108 A1 Jul. 23, 2020

(51) Int. Cl.
| B60R 19/38 | (2006.01) |
| B60R 19/42 | (2006.01) |
| B60R 19/02 | (2006.01) |
| B60R 19/18 | (2006.01) |

(52) U.S. Cl.
CPC ............ B60R 19/38 (2013.01); B60R 19/023 (2013.01); B60R 19/18 (2013.01); B60R 19/42 (2013.01); B60R 2019/1806 (2013.01)

(58) Field of Classification Search
CPC .................................. B60R 19/38; B60R 19/42
USPC .................................................. 293/118, 128
See application file for complete search history.

(56) References Cited

U.S. PATENT DOCUMENTS

| 3,718,357 A | 2/1973 | Hertzell |
| 4,221,410 A * | 9/1980 | Dawson ................... B60R 13/04 293/128 |
| 4,437,697 A | 3/1984 | Hinojos |
| 4,530,519 A | 7/1985 | Marshall |
| 4,648,644 A * | 3/1987 | Swanson .................. B60R 25/00 293/118 |
| 4,993,765 A * | 2/1991 | Ryan ....................... B60R 19/42 293/127 |
| 5,421,625 A * | 6/1995 | Arko ....................... B60R 13/04 188/32 |
| 5,518,283 A | 5/1996 | Egelske |
| 6,893,079 B1 * | 5/2005 | Johnson .................. B60R 19/40 293/114 |
| 7,017,927 B2 | 3/2006 | Henderson |
| 7,077,440 B1 | 7/2006 | Morales |
| D535,928 S | 1/2007 | Crandall |
| 7,354,083 B1 * | 4/2008 | Obermann .............. B60R 19/38 293/126 |
| 9,713,952 B1 | 7/2017 | Brueggeman |
| 2009/0278363 A1 * | 11/2009 | Browne .............. B60R 21/0136 293/118 |
| 2015/0291116 A1 * | 10/2015 | Pi ........................... B60R 13/04 280/164.1 |

* cited by examiner

Primary Examiner — Jason S Morrow (57) ABSTRACT

A vehicle dent protection assembly includes a vehicle that has a plurality of body panels. A plurality of extension units is each removably coupled to the vehicle. Each of the extension units is actuatable between a deploying position and a retracting position. The plurality of extension units includes a set of first extension units and a set of second extension unit. A pair of barrier units is each movably coupled to a respective one of the first and second sets of extension units. Each of the barrier units is urged upwardly along the body panels when the respective first and second sets of extension units are actuated into the deployed position to protect the body panels. Each of the barrier units is drawn beneath the vehicle when the respective first and second sets of extension units are actuated into the retracted position such that the body panels are exposed.

15 Claims, 8 Drawing Sheets

VEHICLE DENT PROTECTION ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to dent protection devices and more particularly pertains to a new dent protection device for inhibiting a vehicle from being dented when the vehicle is parked.

BRIEF SUMMARY OF THE INVENTION

An embodiment of the disclosure meets the needs presented above by generally comprising a vehicle that has a plurality of body panels. A plurality of extension units is each removably coupled to the vehicle. Each of the extension units is actuatable between a deploying position and a retracting position. The plurality of extension units includes a set of first extension units and a set of second extension unit. A pair of barrier units is each movably coupled to a respective one of the first and second sets of extension units. Each of the barrier units is urged upwardly along the body panels when the respective first and second sets of extension units are actuated into the deployed position to protect the body panels. Each of the barrier units is drawn beneath the vehicle when the respective first and second sets of extension units are actuated into the retracted position such that the body panels are exposed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 8 thereof, a new dent protection device embodying the principles and concepts of an embodiment of the disclosure and generally designated by the reference numeral 10 will be described.

As best illustrated in FIGS. 1 through 8, the vehicle dent protection assembly 10 generally comprises a vehicle 12. The vehicle 12 has a plurality of body panels 14, front wheels 16, rear wheels 18 and a bottom side 20. The body panels 14 are distributed along each of a first lateral side 22 and a second lateral side 24 of the vehicle 12. The vehicle 12 may be a passenger vehicle such as a car or pickup, a cargo vehicle or any other vehicle that has deformable body panels.

A plurality of extension units 26 is each of the extension units 26 is removably coupled to the bottom side 20 of the vehicle 12. Each of the extension units 26 is actuatable between a deploying position and a retracting position. The plurality of extension units 26 includes a set of first extension units 28 and a set of second extension units 30. Each of the first extension units 28 is aligned with the first lateral side 22 of the vehicle 12 and each of the second extension units 30 is aligned with the second lateral side 24 of the vehicle 12.

Each of the first 28 and second 30 extension units comprises a pair of disks 32 and each of the disks 32 has a top surface 34 and a perimeter surface 36. Each of each of the disks 32 is hollow and the perimeter surface 36 of each of the disks 32 has an aperture 38 extending into an interior of the disks 32. The top surface 34 of each of the disks 32 is comprised of a magnetic material. Thus, the top surface 34 of each of the disks 32 magnetically engages the bottom side 20 of the vehicle 12 having the aperture 38 in each of the disks 32 being directed outwardly from the vehicle 12. Moreover, each of the disks 32 is positioned adjacent to a respective one of the front 16 and rear 18 wheels.

Each of the extension units 26 includes a pair of motors 40 and each of the motors 40 is positioned within each of a respective one of the disks 32. Each of the motors 40 is turned on to selectively rotate in a first direction and a second direction. Additionally, each of the motors 40 may comprise an electric motor or the like. Each of the motors 40 is electrically coupled to a power source 42 comprising an electrical system of the vehicle 12. A control 44 is positioned in the vehicle 12 and each of motors 40 is electrically coupled to the control 44 for actuating the motors 40 to rotate in the first and second directions.

Each of the extension units 26 includes a pair of screws 46 and each of the screws 46 is rotatably coupled to a respective one of the motors 40. Each of the screws 46 is rotated in the first direction when the respective motor rotates in the first direction. Moreover, each of the screws 46 is rotated in the second direction when the respective motor is rotated in the second direction. Each of the screws 46 extends outwardly from the aperture 38 in a respective one of the disks 32. Additionally, each of the screws 46 has a distal end 48 with respect to the respective disk 32 and the distal end 48 of each of the screws 46 has a stop 50 thereon.

Each of the extension units 26 includes a pair of extension tubes 52, and each of the extension tubes 52 has a first end 54, a second end 56 and an inside surface 58. The first end 54 of each of the extension tubes 52 insertably receives the distal end 48 of a respective one of the screws 46 and the respective screw 46 threadably engages the inside surface of the respective extension tube 52. Each of the extension tubes 52 is urged away each of the respective disk 32 when the respective screw 46 rotates in the first direction. Moreover, each of the extension tubes 52 is drawn toward the respective disk 32 when the respective screw 46 rotates in the second direction.

Each of the extension units 26 includes a pair of members 60 and each of the members 60 has a primary end 62 and a secondary end 64. Each of the members 60 is coupled to the second end of a respective one of the extension tubes 52 having the each of the members 60 being oriented perpendicular to the respective extension tube 52. Additionally, the secondary end 64 of the members 60 of each extension unit 26 is directed toward each other. The primary end 62 of the each of the members 60 is aligned with the second end 56 of the respective extension tube 52.

Each of the extension units 26 includes a pair of engagements 66 and each of the engagements 66 is coupled to a respective one of the extension tubes 52. Each of the engagements 66 is positioned adjacent to the first end 54 of the respective extension tube 52. Additionally, each of the engagements 66 engages the stop 50 on a respective one of the screws 46 when the respective stop 50 on the respective screw 46 travels to the first end 54 of the respective extension tube 52. Thus, the respective extension tube 52 is rotated about an axis extending through the first 54 and second 56 ends of the respective extension tube 52 when the engagement 66 engages the stop 50. In this way the member 60 that is coupled to the respective extension tube 52 is urged into an upwardly angling position along the body panels 14 on the vehicle 12.

A pair of barrier units 68 is provided and each of the barrier units 68 is movably coupled to a respective one of the first 28 and second 30 sets of extension units. Each of the barrier units 68 is urged upwardly along the body panels 14 when the respective first 28 and second 30 sets of extension units is actuated into the deployed position. In this way each of the barrier units 68 protect the body panels 14 from being struck by an object. Each of the barrier units 68 is drawn beneath the vehicle 12 when the respective first 28 and second 30 sets of extension units is actuated into the retracted position such that the body panels 14 are exposed.

Each of the barrier units 68 comprises a plurality of first pivots 70 and each of the first pivots 70 is rotatably coupled to a respective one of the members 60 on a respective one of the first 28 and second 30 extension units. Each of the first pivots 70 is centrally positioned on the respective member 60 and each of the first pivots 70 is directed toward the vehicle 12. Additionally, each of the first pivots 70 has a distal end 72 with respect to the respective member 60.

Each of the barrier units 68 includes a plurality of first sleeves 74 and each of the first sleeves 74 has a first end 76, a second end 78 and an outer surface 80. The first end 76 of each of the first sleeves 74 is open and the distal end 72 of a respective one of the first pivots 70 is coupled to the outer surface 80 of a respective one of the first sleeves 74. In this way each of the first sleeves 74 is pivotally coupled to a respective one of the members 60. The first end 76 of each of the first sleeves 74 on the first extension unit 28 is directed toward each other. Additionally, the first end 76 of each of the first sleeves 74 on the second extension unit 30 is directed toward each other.

Each of the first sleeves 74 is oriented collinear with the member 60 on which the respective first pivot 70 is coupled when the respective first 28 and second 30 extension units is positioned in the retracted position. Each of the first sleeves 74 is urged upwardly along respective ones of the body panels 14 and is horizontally oriented when the respective first 28 and second 30 extension units is positioned in the deployed position. In this way the first sleeves 74 are positioned to protect the respective body panel 14 from impact damage.

A plurality of wheel bumpers 82 is provided and each of the wheel bumpers 82 is coupled to and extends away from the outer surface of a respective one of the first sleeves 74. Each of the wheel bumpers 82 is aligned with the second end of the respective first sleeve 74. Moreover, each of the wheel bumpers 82 is aligned with a respective one of the front and rear wheels 18 when the extension units 26 are urged into the deployed position. Each of the wheel bumpers 82 engages the respective front 16 and rear 18 wheels when the respective first sleeve 74 is struck by an object. In this way the wheel bumpers 82 inhibits the respective first sleeve 74 from contacting the body panels 14 on the vehicle 12.

Each of the barrier units 68 includes a rod 84. The first end 76 of a respective pair of the first sleeves 74 insertably receives the rod 84. Thus, each of the respective pair of first sleeves 74 is retained in a horizontal orientation when the first 28 and second 30 extension units are positioned in the deployed position. Each of the barrier units 68 includes a plurality of second pivots 86. Each of the second pivots 86 is pivotally coupled to a respective one of the members 60 on a respective one of the first 28 and second 30 extension units. Each of the second pivots 86 is directed away from disks 32 on the respective first 28 and second 30 extension units and each of the second pivots has a distal end 87 with respect to the respective member 60. Moreover, each of the second pivots 86 is aligned with the secondary end 64 of the respective member 60.

Each of the barrier units 68 includes a plurality of second sleeves 88, and each of the second sleeves 88 has a first end 90, a second end 92 and an outer surface 94. The first end 90 of each of the second sleeves 88 is open. Additionally, the distal end 87 of a respective one of the second pivots 86 is coupled to the outer surface of a respective one of the second sleeves 88. In this way each of the second sleeves 88 is pivotally coupled to a respective one of the members 60. The first end of each of the second sleeves 88 on the first extension unit is directed toward each other. The first end of each of the second sleeves 88 on the second extension each of the second sleeves 88 is directed toward each other.

Each of the second sleeves 88 is oriented collinear with the member on which the respective second pivot is coupled when the respective first and second extension units 30 is positioned in the retracted position. Moreover, each of the second sleeves 88 is urged upwardly along respective ones of the body panels 14 and is horizontally oriented when the respective first 28 and second 30 extension units is positioned in the deployed position. Each of the second sleeves 88 is positioned above respective ones of the first sleeves 74 when the first 28 and second 30 extension units is positioned in the deployed position.

Each of the barrier units 68 includes a plurality of body panel bumpers 96 and each of the body panel bumpers 96 is coupled to the outer surface 94 of a respective one of the second sleeves 88. Each of the body panel bumpers 96 is aligned with the second end 92 of the respective second sleeve 88. Additionally, each of the body panel bumpers 96 engages a respective one of the body panels 14 when the respective second sleeve 88 is struck by an object thereby inhibiting the respective second sleeve 88 from contacting the body panels 14. Each of the body panel bumpers 96 and each of the wheel bumpers 82 are comprised of a resiliently compressible material, such as rubber or the like. In this way the front wheels 16, the rear wheels 18 and the body panels 14 are inhibited from being damaged by the wheel bumpers 82 and the body panel bumpers 96.

Each of the barrier units 68 includes a pole 98. The first end 90 of a respective one of the second sleeves 88 insertably receives a respective one of the pole 98. Thus, each of the second sleeves 88 is retained in a horizontal orientation when the first 28 and second 30 extension units are positioned in the deployed position.

Figure 1:
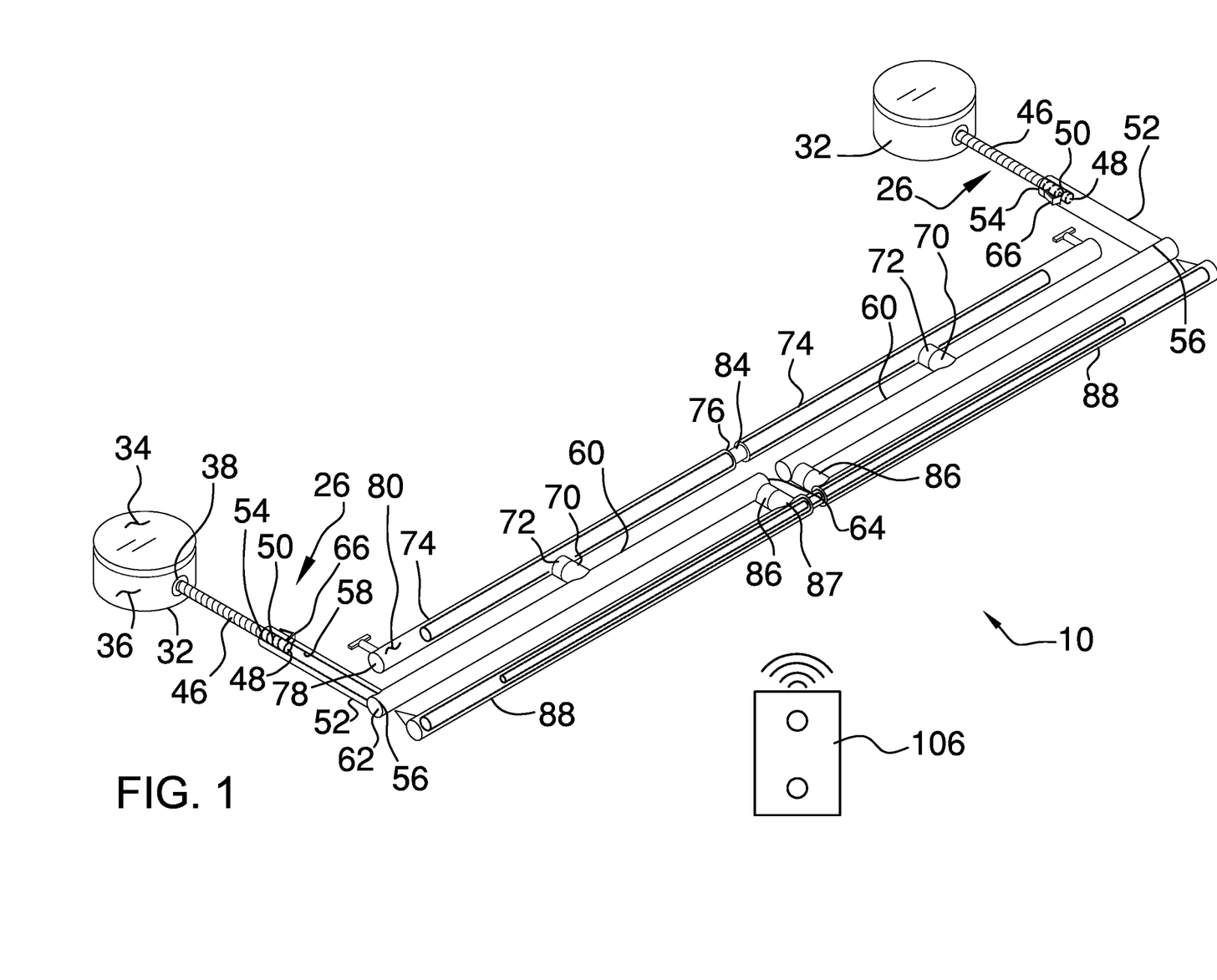
FIG. 1 is a top perspective view of a pair of extension units and a barrier unit of a vehicle dent protection assembly according to an embodiment of the disclosure.
Figure 2:
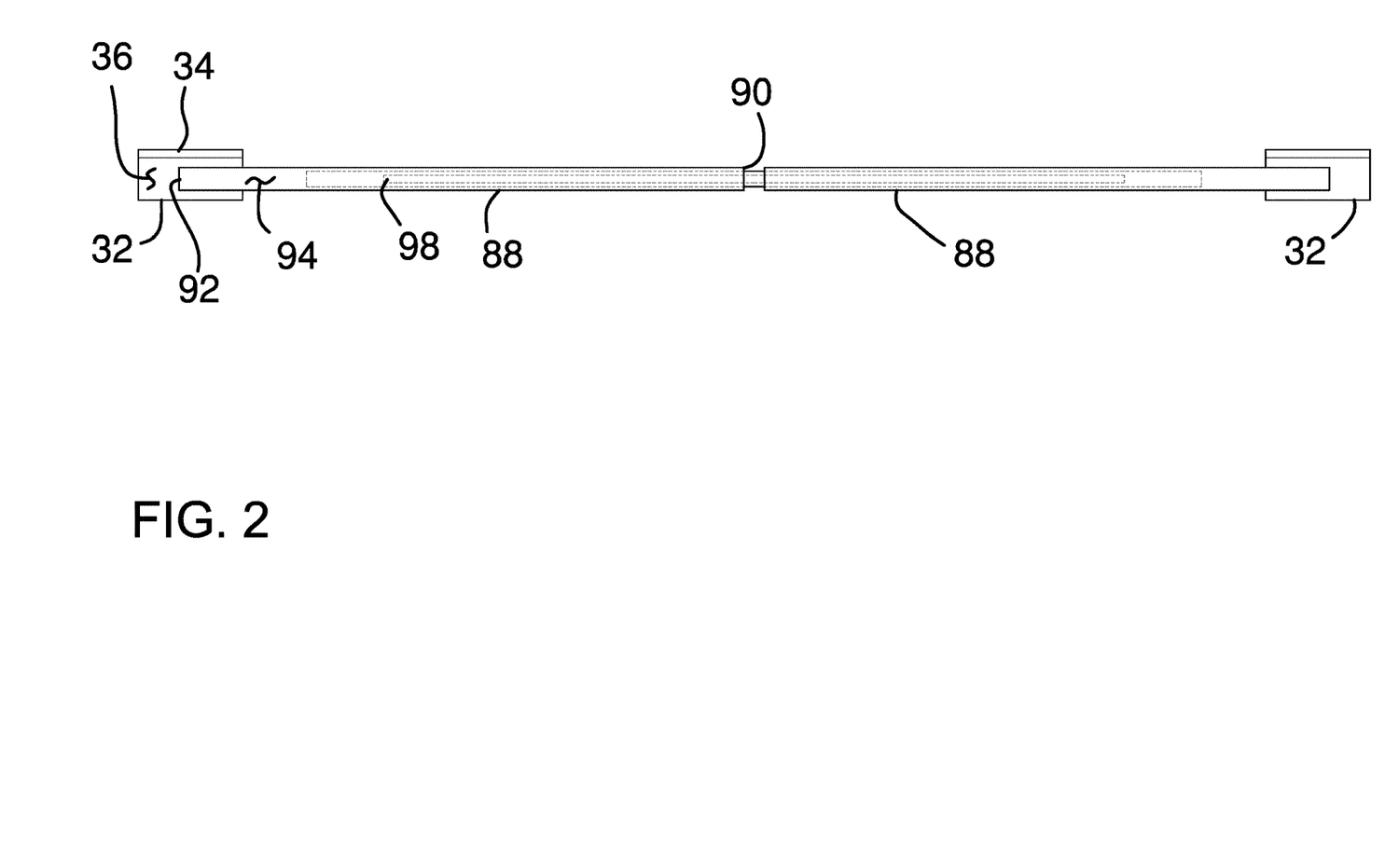
FIG. 2 is a front phantom view of a barrier unit and a pair of extension units of an embodiment of the disclosure.
Figures 3A, 3B:
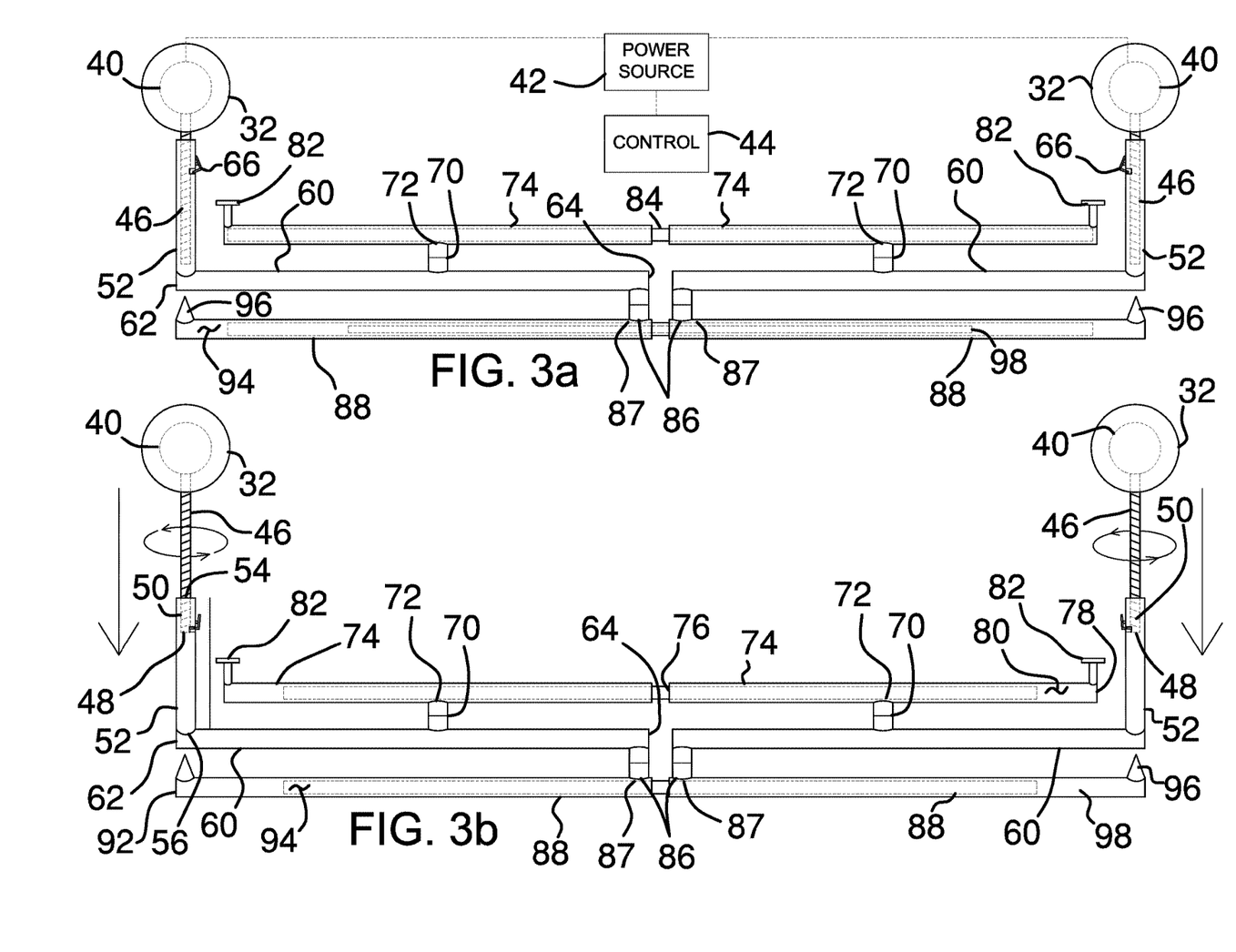
FIG. 3A is a top phantom view of a pair of extension units and a barrier unit of an embodiment of the disclosure showing the extension units in a retracted position.
FIG. 3B is a top phantom view of a pair of extension units and a barrier unit an embodiment of the disclosure showing the extension units in a deployed position.
Figure 4:
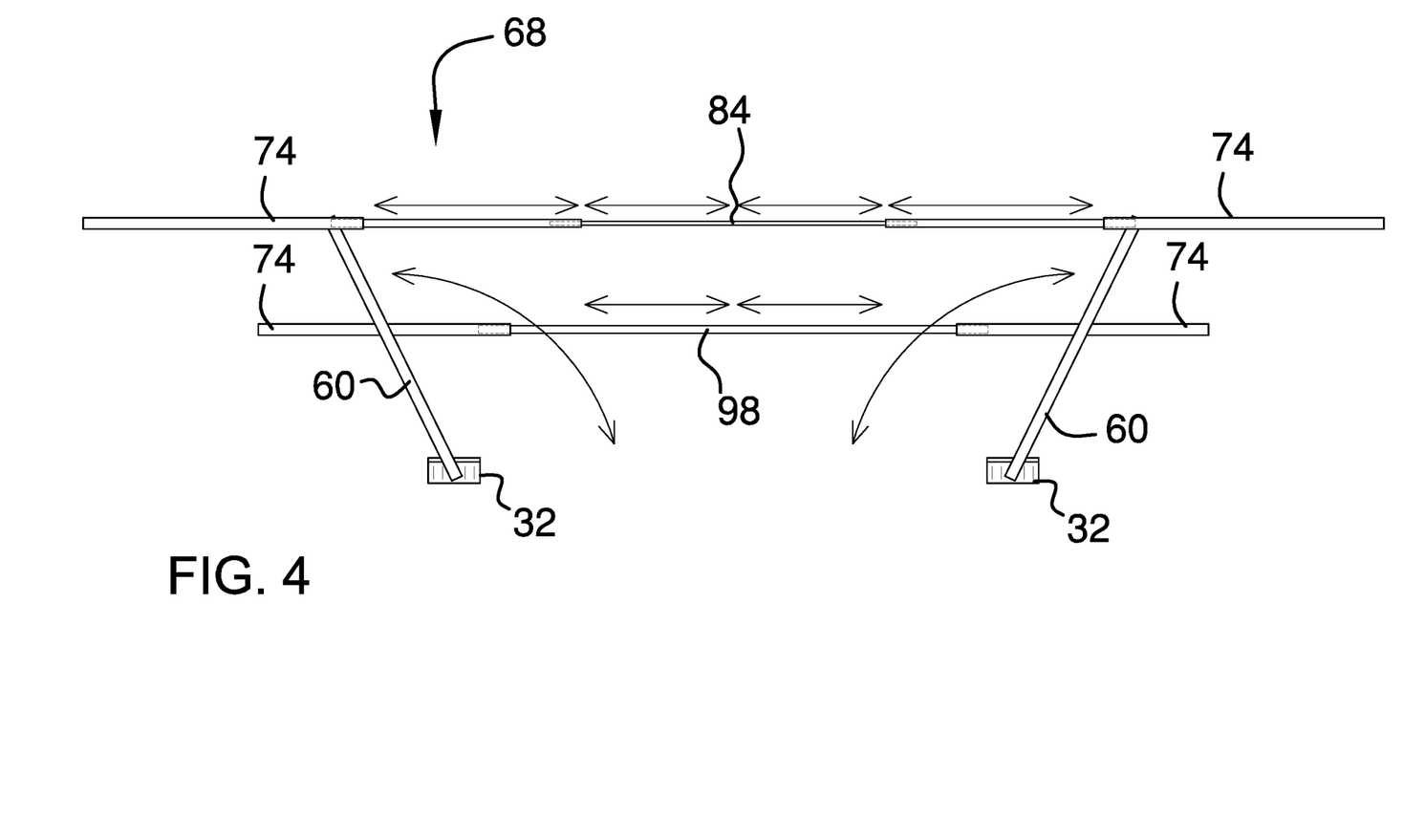
FIG. 4 is a front view of a pair of extension units and a barrier unit an embodiment of the disclosure showing the barrier unit being urged upwardly.
Figure 5:
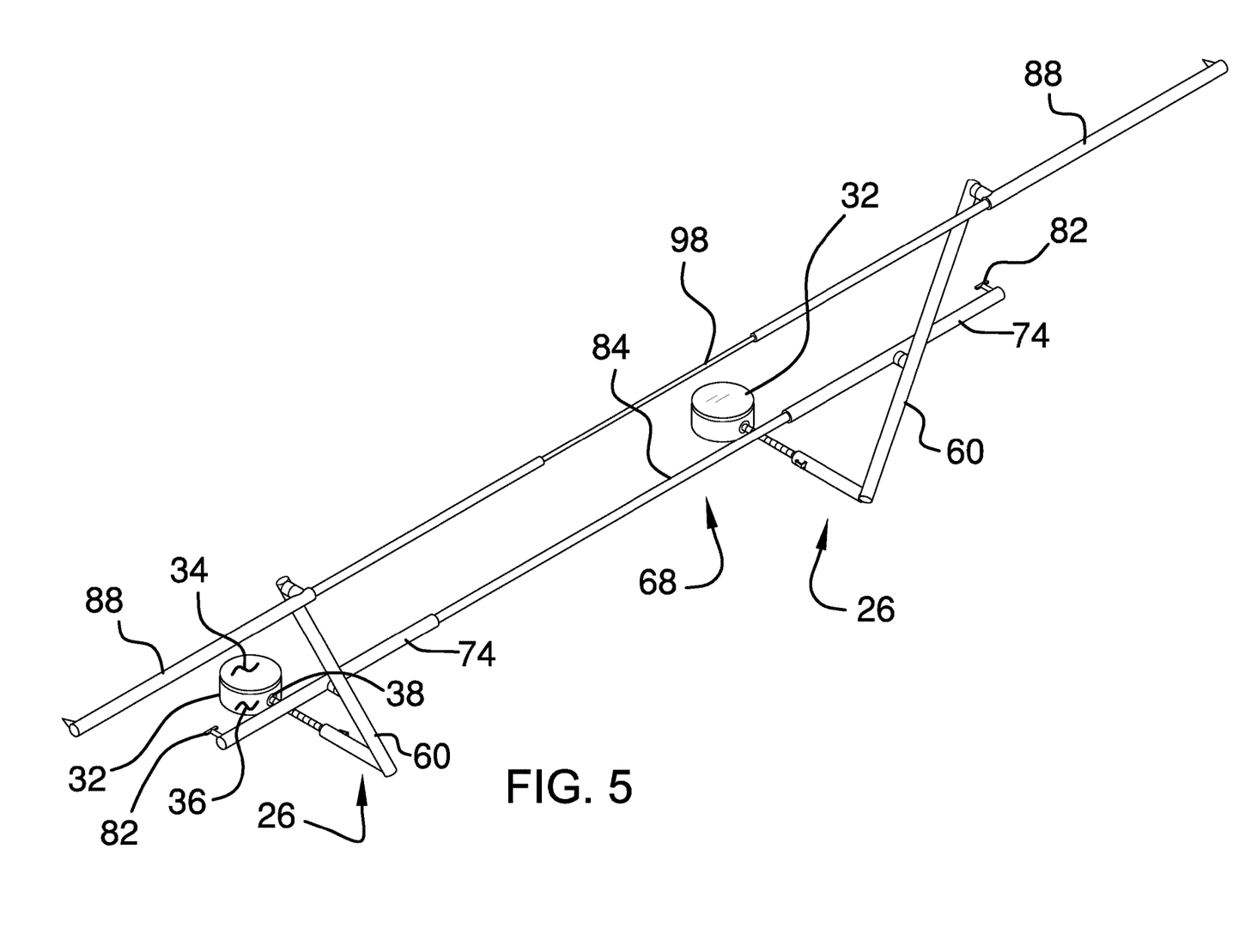
FIG. 5 is a perspective view of a pair of extension units and a barrier unit of an embodiment of the disclosure showing the extension units being positioned in a deployed position and the barrier unit being urged upwardly.
Figure 6:
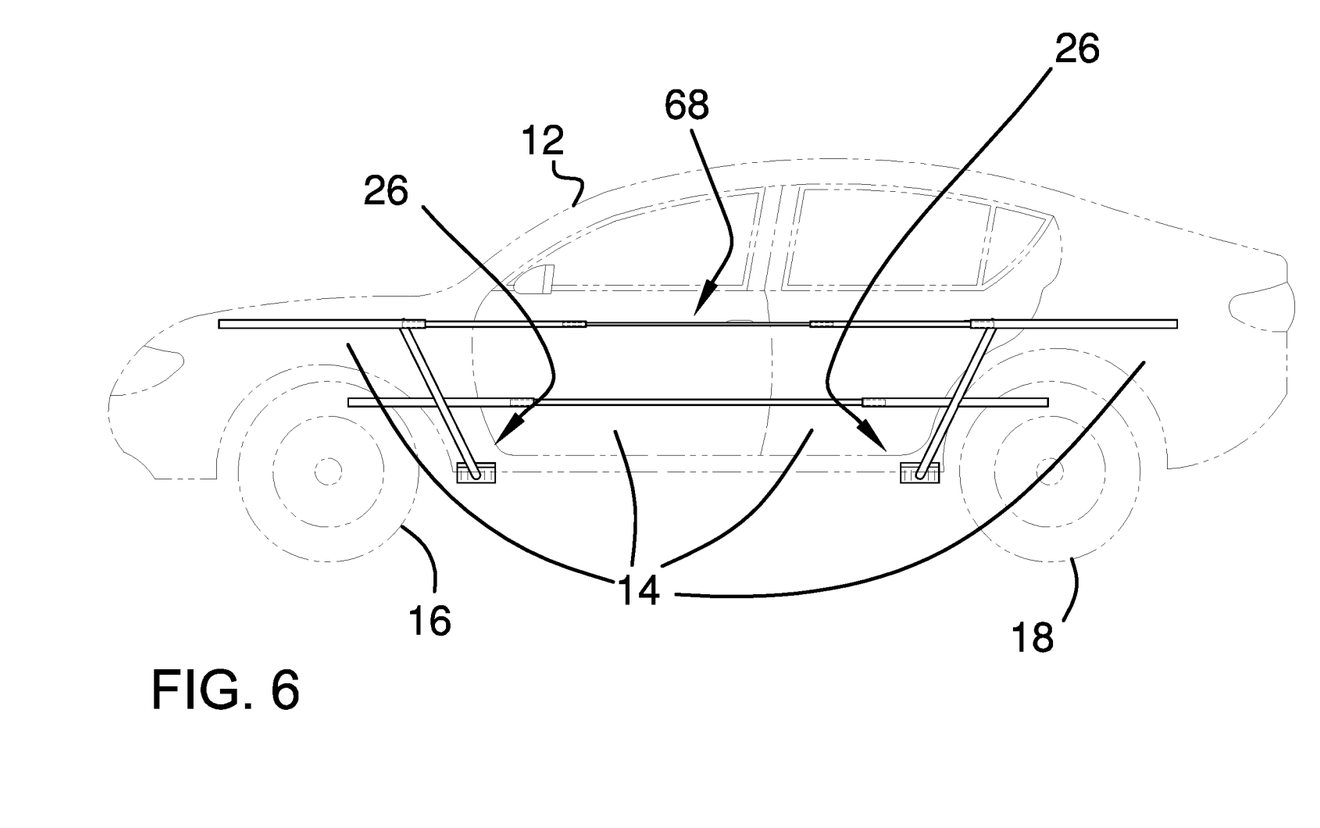
FIG. 6 is a left side in-use view of an embodiment of the disclosure showing a pair of extension units being positioned in a deployed position and a barrier unit being urged upwardly along a vehicle.
Figure 7:
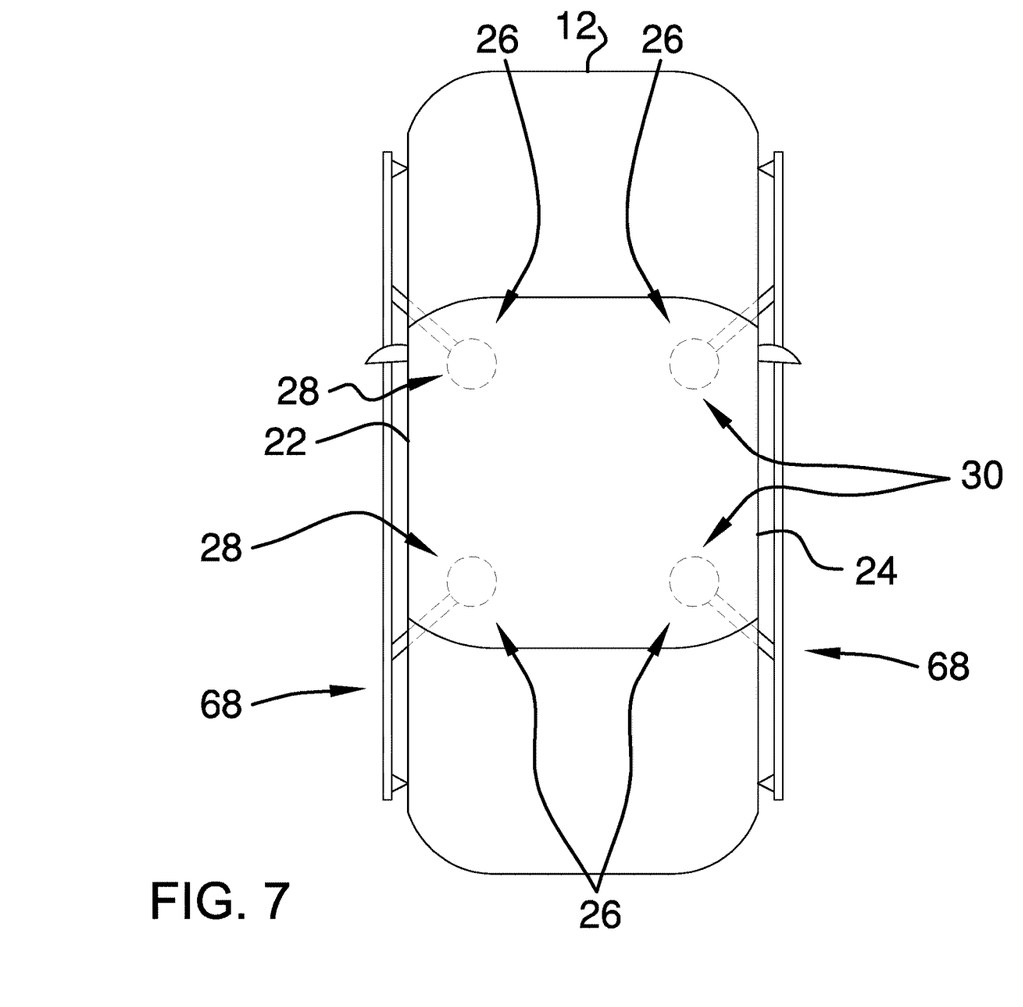
FIG. 7 is a top view of an embodiment of the disclosure showing a pair of barrier units being urged upwardly along a vehicle.
Figure 8:
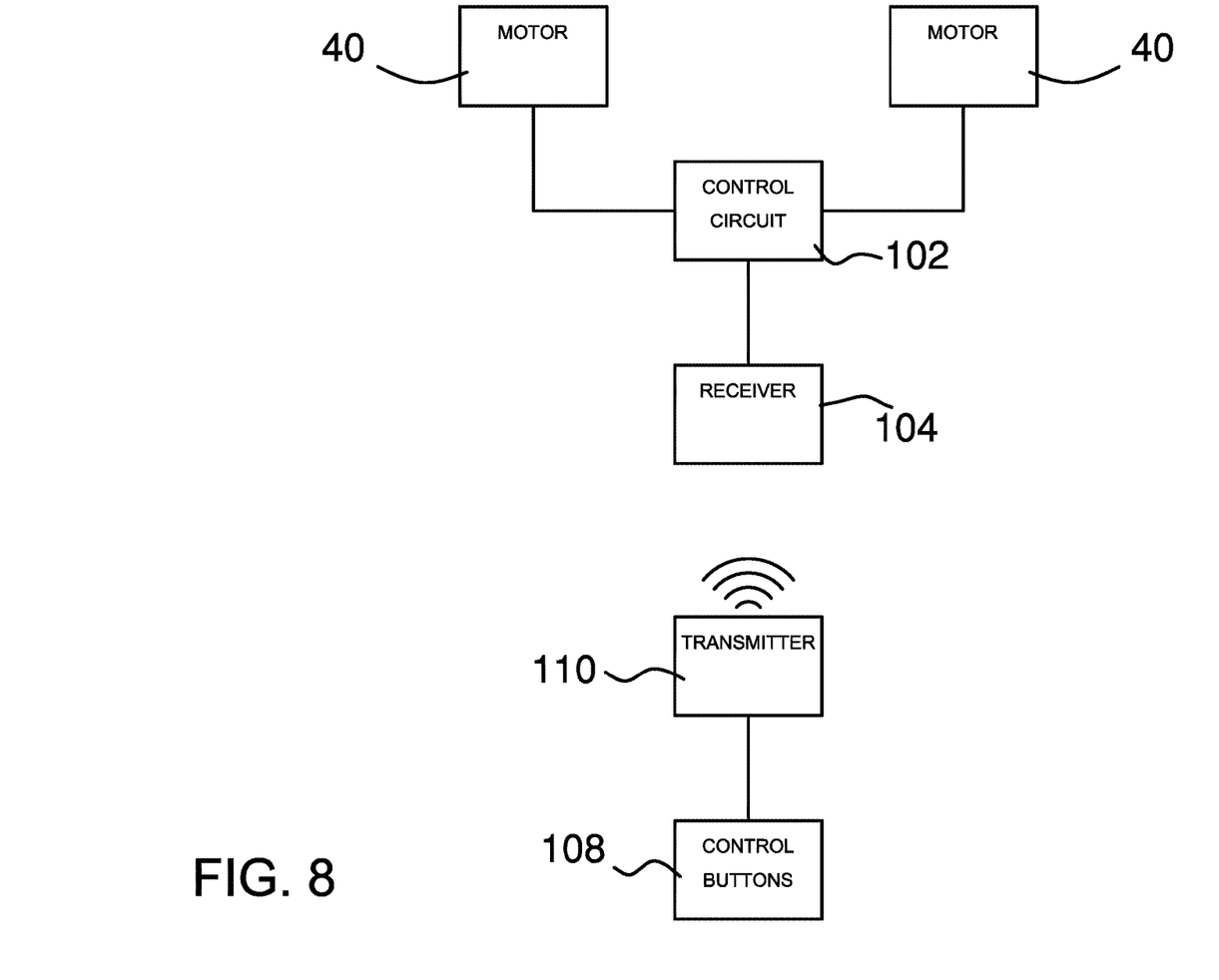
FIG. 8 is a schematic view of a remote control system of an embodiment of the disclosure.

A remote control system 100 is provided that includes a control circuit 102 that is coupled to a respective extension unit 26 and a receiver 104 that is coupled to the respective extension unit 26. The control circuit 102 is electrically coupled to each of the motors 40 in each of the extension units 26 and the receiver 104 is electrically coupled to the control circuit 102. Each of the motors 40 is turned on to rotate in the first direction when the control circuit 102 receives a deploy signal. Additionally, each of the motors 40 is turned on to rotate in the second direction when the control circuit 102 receives a retract signal. The receiver 104 may be a radio frequency receiver or the like. The remote control system 100 includes a remote control 106, which includes a plurality of control buttons 108 that are each electrically coupled to a transmitter 110. The transmitter 110 is in wireless electrical communication with the receiver 104 in the extension unit 26. Thus, the transmitter 110 transmits the deploy signal or the retract signal to the control circuit 102 for remotely deploying and retracting the extension units. Additionally, the transmitter 110 may be a radio frequency transmitter or the like.

In use, each of the barrier units 68 is retraced beneath the bottom side 20 of the vehicle 12 when the extension units 26 are positioned in the retracting position. Thus, the vehicle 12 can be operated in a normal fashion. Each of the barrier units 68 is urged outwardly from the bottom side 20 of the vehicle 12 and upwardly along respective ones of the body panels 14 when the extension units 26 are positioned in the deploying position. In this way the barrier units 68 protect the body panels 14 from being dented by the door on an adjacent vehicle 12 in a parking lot or the like. Each of the extension units 26 are positioned in the retracting position prior to driving the vehicle 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle dent protection assembly being configured to protect body panels on a vehicle from being dented by an adjacent vehicle door, said assembly comprising:

a vehicle having a plurality of body panels, front wheels, rear wheels and a bottom side, said body panels being distributed along each of a first lateral side and a second lateral side of said vehicle;

a plurality of extension units, each of said extension units being removably coupled to said bottom side of said vehicle, each of said extension units being actuatable between a deploying position and a retracting position, said plurality of extension units including a set of first extension units and a set of second extension units, each of said first extension units being aligned with said first lateral side of said vehicle, each of said second extension units being aligned with said second lateral side of said vehicle;

a pair of barrier units, each of said barrier units being movably coupled to a respective one of said first and second sets of extension units, each of said barrier units being urged upwardly along said body panels when said respective first and second sets of extension units is actuated into said deployed position wherein each of said barrier units is configured to protect said body panels from being struck by an object, each of said barrier units being drawn beneath said vehicle when said respective first and second sets of extension units is actuated into said retracted position such that said body panels are exposed; and wherein each of said first and second extension units comprises a pair of disks, each of each of said disks having a top surface and a perimeter surface, each of each of said disks being hollow, said perimeter surface of each of said disks having an aperture extending into an interior of said disks, said top surface of each of said disks being comprised of a magnetic material, said top surface of each of said disks magnetically engaging said bottom side of said vehicle having said aperture in each of said disks being directed outwardly from said vehicle, each of said disks being positioned adjacent to a respective one of said front and rear wheels.

2. The assembly according to claim 1, further comprising:
a pair of motors, each of said motors being positioned within each of a respective one of said disks, each of said motors being turned on to selectively rotate in a first direction and a second direction; and
a pair of screws, each of said screws being rotatably coupled to a respective one of said motors, each of said screws being rotated in said first direction when said respective motor rotates in said first direction, each of said screws being rotated in said second direction when said respective motor is rotated in said second direction, each of said screws extending outwardly from said aperture in a respective one of said disks, each of said screws having a distal end with respect to said respective disk, said distal end of each of said screws having a stop thereon.

3. The assembly according to claim 2, further comprising a pair of extension tubes, each of said extension tubes having a first end, a second end and an inside surface, said first end of each of said extension tubes insertably receiving said distal end of a respective one of said screws having said respective screw threadably engaging said inside surface of said respective extension tube, each of said extension tubes being urged away each of said respective disk when said respective screw rotates in said first direction, each of said extension tubes being drawn toward said respective disk when said respective screw rotates in said second direction.

4. The assembly according to claim 3, further comprising a pair of members, each of said members having a primary end and a secondary end, each of said members being coupled to said second end of a respective one of said tubes having said each of said members being oriented perpendicular to said respective extension tube having said secondary end of said members being directed toward each other, said primary end of said each of said members being aligned with said second end of said respective tube.

5. The assembly according to claim 4, further comprising a pair of engagements, each of said engagements being coupled to a respective one of said extension tubes, each of said engagements being positioned adjacent to said first end of said respective extension tube, each of said engagements engaging said stop on a respective one of said screws when said respective stop on said respective screw travels to said first end of said respective extension tube.

6. The assembly according to claim 5, wherein said respective extension tube is rotated about an axis extending through said first and second ends of said respective extension tube when said engagement engages said stop thereby rotating said member being coupled to said respective extension tube into an upwardly angling position along said body panels on said vehicle.

7. The assembly according to claim 4, wherein each of said barrier units comprises a plurality of first pivots, each of said first pivots being rotatably coupled to a respective one of said members on a respective one of said first and second extension units, each of said first pivots being centrally positioned on said respective member, each of said first pivots being directed toward said vehicle, each of said first pivots having a distal end with respect to said respective member.

8. The assembly according to claim 7, further comprising:
a plurality of first sleeves, each of said first sleeves having a first end, a second end and an outer surface, said first end of each of said first sleeves being open, said distal end of a respective one of said first pivots being coupled to said outer surface of a respective one of said first sleeves;
said first end of each of said first sleeves on said first extension unit being directed toward each other;
said first end of each of said first sleeves on said second extension unit being directed toward each other;
each of said first sleeves being oriented collinear with said member on which said respective first pivot is coupled when said respective first and second extension units is positioned in said retracted position; and
each of said first sleeves being urged upwardly along respective ones of said body panels and being horizontally oriented when said respective first and second extension units is positioned in said deployed position.

9. The assembly according to claim 8, further comprising:
a plurality of wheel bumpers, each of said wheel bumpers being coupled to and extending away from said outer surface of a respective one of said first sleeves, each of said wheel bumpers being aligned with said second end of said respective first sleeve; and
each of said wheel bumpers being aligned with a respective one of said front and rear wheels when said extension units are urged into said deployed position, each of said wheel bumpers engaging said respective front and rear wheels when said respective first sleeve is struck by an object thereby inhibiting said respective first sleeve from contacting said body panels on said vehicle.

10. The assembly according to claim 8, further comprising a rod, said first end of a respective pair of said first sleeves insertably receiving said a respective one of said rod such that each of said respective pair of first sleeves is retained in a horizontal orientation when said first and second extension units are positioned in said deployed position.

11. The assembly according to claim 8, wherein each of said barrier units includes a plurality of second pivots, each of said second pivots being pivotally coupled to a respective one of said members on a respective one of said first and second extension units, each of said second pivots having a distal end with respect to said respective member, each of said second pivots being directed away from disks on said respective first and second extension units, each of said second pivots being aligned with said secondary end of said respective member.

12. The assembly according to claim 11, further comprising:
a plurality of second sleeves, each of said second sleeves having a first end, a second end and an outer surface, said first end of each of said second sleeves being open, said distal end of a respective one of said second pivots being coupled to said outer surface of a respective one of said second sleeves;

said first end of each of said second sleeves on said first extension unit being directed toward each other;

said first end of each of said second sleeves on said second extension unit being directed toward each other;

each of said second sleeves being oriented collinear with said member on which said respective second pivot is coupled when said respective first and second extension units is positioned in said retracted position; and each of said second sleeves being urged upwardly along respective ones of said body panels and being horizontally oriented when said respective first and second extension units is positioned in said deployed position, each of said second sleeves being positioned above respective ones of said first sleeves when said first and second extension units is positioned in said deployed position.

13. The assembly according to claim 12, further comprising a plurality of body panel bumpers, each of said body panel bumpers being coupled to said outer surface of a respective one of said second sleeves, each of said body panel bumpers being aligned with said second end of said respective second sleeve, each of said body panel bumpers engaging a respective one of said body panels when said respective second sleeve is struck by an object thereby inhibiting said respective second sleeve from contacting said body panels.

14. The assembly according to claim 13, further comprising a pole, said first end of a respective one of said second sleeves insertably receiving a respective one of said pole such that each of said second sleeves is retained on a horizontal orientation when said first and second extension units are positioned in said deployed position.

15. A vehicle dent protection assembly being configured to protect body panels on a vehicle from being dented by an adjacent vehicle door, said assembly comprising:

a vehicle having a plurality of body panels, front wheels, rear wheels and a bottom side, said body panels being distributed along each of a first lateral side and a second lateral side of said vehicle;

a plurality of extension units, each of said extension units being removably coupled to said bottom side of said vehicle, each of said extension units being actuatable between a deploying position and a retracting position, said plurality of extension units including a set of first extension units and a set of second extension units, each of said first extension units being aligned with said first lateral side of said vehicle, each of said second extension units being aligned with said second lateral side of said vehicle, each of said first and second extension units comprising:

a pair of disks, each of each of said disks having a top surface and a perimeter surface, each of each of said disks being hollow, said perimeter surface of each of said disks having an aperture extending into an interior of said disks, said top surface of each of said disks being comprised of a magnetic material, said top surface of each of said disks magnetically engaging said bottom side of said vehicle having said aperture in each of said disks being directed outwardly from said vehicle, each of said disks being positioned adjacent to a respective one of said front and rear wheels;

a pair of motors, each of said motors being positioned within each of a respective one of said disks, each of said motors being turned on to selectively rotate in a first direction and a second direction;

a pair of screws, each of said screws being rotatably coupled to a respective one of said motors, each of said screws being rotated in said first direction when said respective motor rotates in said first direction, each of said screws being rotated in said second direction when said respective motor is rotated in said second direction, each of said screws extending outwardly from said aperture in a respective one of said disks, each of said screws having a distal end with respect to said respective disk, said distal end of each of said screws having a stop thereon;

a pair of extension tubes, each of said extension tubes having a first end, a second end and an inside surface, said first end of each of said extension tubes insertably receiving said distal end of a respective one of said screws having said respective screw threadably engaging said inside surface of said respective extension tube, each of said extension tubes being urged away each of said respective disk when said respective screw rotates in said first direction, each of said extension tubes being drawn toward said respective disk when said respective screw rotates in said second direction;

a pair of members, each of said members having a primary end and a secondary end, each of said members being coupled to said second end of a respective one of said tubes having said each of said members being oriented perpendicular to said respective extension tube having said secondary end of said members being directed toward each other, said primary end of said each of said members being aligned with said second end of said respective tube; and a pair of engagements, each of said engagements being coupled to a respective one of said extension tubes, each of said engagements being positioned adjacent to said first end of said respective extension tube, each of said engagements engaging said stop on a respective one of said screws when said respective stop on said respective screw travels to said first end of said respective extension tube, said respective extension tube being rotated about an axis extending through said first and second ends of said respective extension tube when said engagement engages said stop thereby rotating said member being coupled to said respective extension tube into an upwardly angling position along said body panels on said vehicle; and a pair of barrier units, each of said barrier units being movably coupled to a respective one of said first and second sets of extension units, each of said barrier units being urged upwardly along said body panels when said respective first and second sets of extension units is actuated into said deployed position wherein each of said barrier units is configured to protect said body panels from being struck by an object, each of said barrier units being drawn beneath said vehicle when said respective first and second sets of extension units is actuated into said retracted position such that said body panels are exposed, each of said barrier units comprising:

a plurality of first pivots, each of said first pivots being rotatably coupled to a respective one of said members on a respective one of said first and second extension units, each of said first pivots being centrally positioned on said respective member, each of said first pivots being directed toward said vehicle, each of said first pivots having a distal end with respect to said respective member;
a plurality of first sleeves, each of said first sleeves having a first end, a second end and an outer surface, said first end of each of said first sleeves being open, said distal end of a respective one of said first pivots being coupled to said outer surface of a respective one of said first sleeves, said first end of each of said first sleeves on said first extension unit being directed toward each other, said first end of each of said first sleeves on said second extension unit being directed toward each other, each of said first sleeves being oriented collinear with said member on which said respective first pivot is coupled when said respective first and second extension units is positioned in said retracted position, each of said first sleeves being urged upwardly along respective ones of said body panels and being horizontally oriented when said respective first and second extension units is positioned in said deployed position;
a plurality of wheel bumpers, each of said wheel bumpers being coupled to and extending away from said outer surface of a respective one of said first sleeves, each of said wheel bumpers being aligned with said second end of said respective first sleeve, each of said wheel bumpers being aligned with a respective one of said front and rear wheels when said extension units are urged into said deployed position, each of said wheel bumpers engaging said respective front and rear wheels when said respective first sleeve is struck by an object thereby inhibiting said respective first sleeve from contacting said body panels on said vehicle;
a rod, said first end of a respective pair of said first sleeves insertably receiving said a respective one of said rod such that each of said respective pair of first sleeves is retained in a horizontal orientation when said first and second extension units are positioned in said deployed position;
a plurality of second pivots, each of said second pivots being pivotally coupled to a respective one of said members on a respective one of said first and second extension units, each of said second pivots having a distal end with respect to said respective member, each of said second pivots being directed away from disks on said respective first and second extension units, each of said second pivots being aligned with said secondary end of said respective member;
a plurality of second sleeves, each of said second sleeves having a first end, a second end and an outer surface, said first end of each of said second sleeves being open, said distal end of a respective one of said second pivots being coupled to said outer surface of a respective one of said second sleeves, said first end of each of said second sleeves on said first extension unit being directed toward each other, said first end of each of said second sleeves on said second extension unit being directed toward each other, each of said second sleeves being oriented collinear with said member on which said respective second pivot is coupled when said respective first and second extension units is positioned in said retracted position, each of said second sleeves being urged upwardly along respective ones of said body panels and being horizontally oriented when said respective first and second extension units is positioned in said deployed position, each of said second sleeves being positioned above respective ones of said first sleeves when said first and second extension units is positioned in said deployed position;
a plurality of body panel bumpers, each of said body panel bumpers being coupled to said outer surface of a respective one of said second sleeves, each of said body panel bumpers being aligned with said second end of said respective second sleeve, each of said body panel bumpers engaging a respective one of said body panels when said respective second sleeve is struck by an object thereby inhibiting said respective second sleeve from contacting said body panels; and
a pole, said first end of a respective one of said second sleeves insertably receiving a respective one of said pole such that each of said second sleeves is retained on a horizontal orientation when said first and second extension units are positioned in said deployed position.

* * * * *